US012285949B2

(12) United States Patent
Kawagoe

(10) Patent No.: US 12,285,949 B2
(45) Date of Patent: Apr. 29, 2025

(54) LIQUID DISCHARGING APPARATUS

(71) Applicant: BROTHER KOGYO KABUSHIKI KAISHA, Nagoya (JP)

(72) Inventor: Masako Kawagoe, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 102 days.

(21) Appl. No.: 18/330,765

(22) Filed: Jun. 7, 2023

(65) Prior Publication Data

US 2024/0001681 A1 Jan. 4, 2024

(30) Foreign Application Priority Data

Jun. 30, 2022 (JP) ................................ 2022-105651

(51) Int. Cl.

| | |
|---|---|
| ***B41J 2/17*** | (2006.01) |
| ***B41J 2/165*** | (2006.01) |
| ***B41J 2/185*** | (2006.01) |
| ***B41J 11/58*** | (2006.01) |

(52) U.S. Cl.

CPC ......... *B41J 2/1721* (2013.01); *B41J 2/16523* (2013.01); *B41J 2/185* (2013.01); *B41J 11/58* (2013.01); *B41J 2002/1856* (2013.01)

(58) Field of Classification Search

CPC .. B41J 2/1721; B41J 2/185; B41J 2002/1856; B41J 2/16508

USPC ........................................................... 347/36

See application file for complete search history.

(56) References Cited

FOREIGN PATENT DOCUMENTS

| | | | | |
|---|---|---|---|---|
| JP | 2015-63007 A | | 4/2015 | |
| JP | 2022124597 A | * | 8/2022 | ................ B41J 2/01 |

* cited by examiner

*Primary Examiner* — Sharon Polk

(74) *Attorney, Agent, or Firm* — Merchant & Gould P.C.

(57) ABSTRACT

A liquid discharging apparatus, having a housing, a first tray for storing a printable medium, a second tray for storing a printable medium, a liquid discharging head, and a first waste liquid storage, is provided. The second tray is located at a position lower than the first tray. The liquid discharging head has nozzles for discharging liquid. The first waste liquid storage is demountably mounted in the housing. The first waste liquid storage is configured to store waste liquid being the liquid discharged from the nozzles of the liquid discharging head. The first waste liquid storage is located between the first tray and the second tray.

17 Claims, 12 Drawing Sheets

LIQUID DISCHARGING APPARATUS

REFERENCE TO RELATED APPLICATIONS

This application claims priority from Japanese Patent Application No. 2022-105651 filed on Jun. 30, 2022. The entire content of the priority application is incorporated herein by reference.

BACKGROUND ART

An inkjet printer that may perform a printing operation with a printable medium by discharging ink at the printable medium is known. The inkjet printer may have a waste liquid unit to collect ink used for purposes other than the printing operation. For example, the inkjet printer may have a waste-liquid-unit attachment section, to which the waste liquid unit is attachable, and the waste-liquid-unit attachment section may be located to be lower than a bottom of a feeder-cassette attachment section, to which a feeder cassette is attachable.

DESCRIPTION

With the waste-liquid-unit attachment section located to be lower than the bottom of the feeder-cassette attachment section, a size of the inkjet printer may undesirably increase in a direction of height.

The present disclosure is advantageous in that a liquid discharging apparatus having a waste liquid reservoir with a large capacity, while a size of the liquid discharging apparatus is restrained from increasing in a direction of height, is provided.

FIRST EMBODIMENT

<External Configuration of Inkjet Printer 1>

Figure 1:
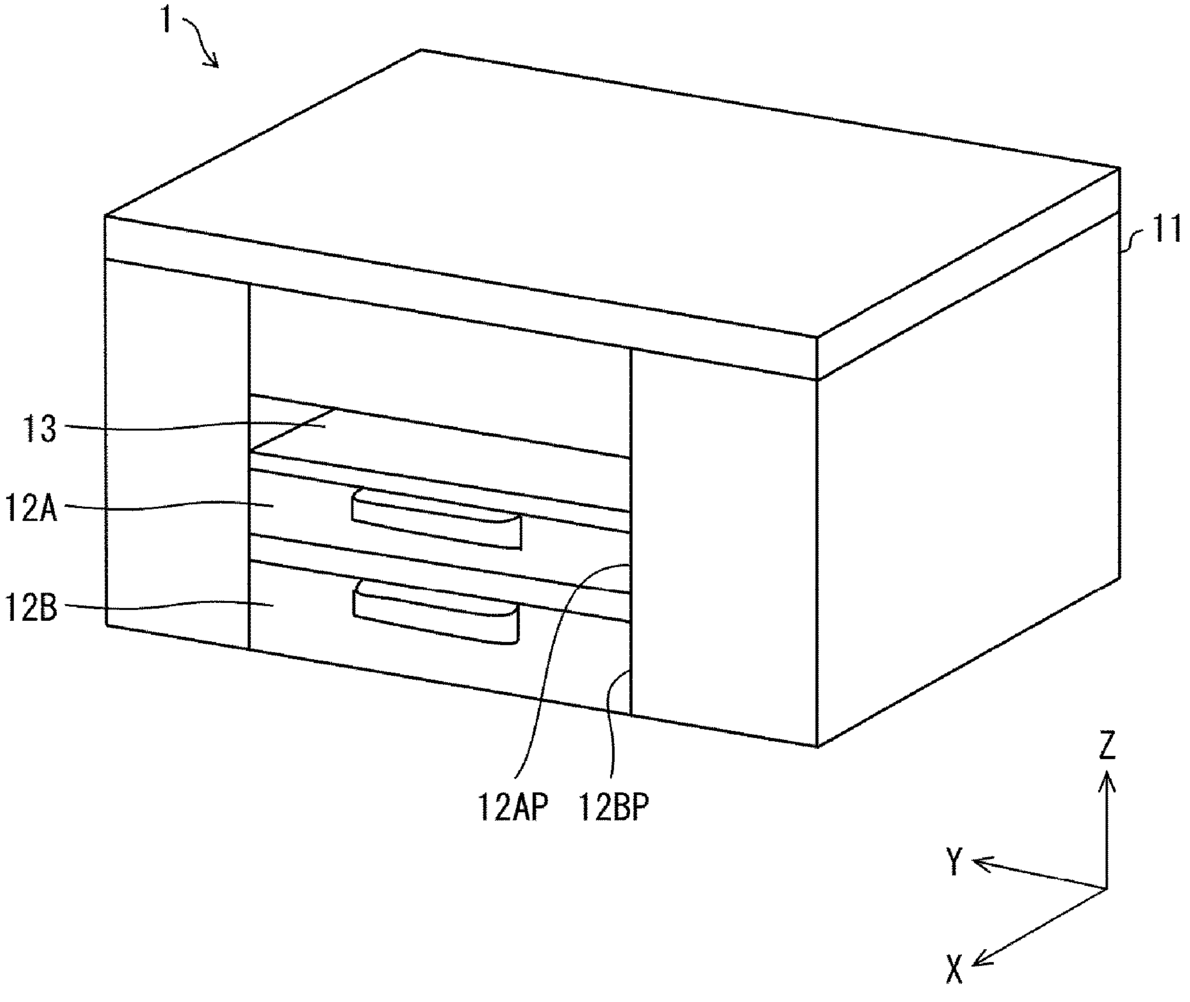
FIG. 1 is a perspective exterior view of an inkjet printer.
Figure 2:
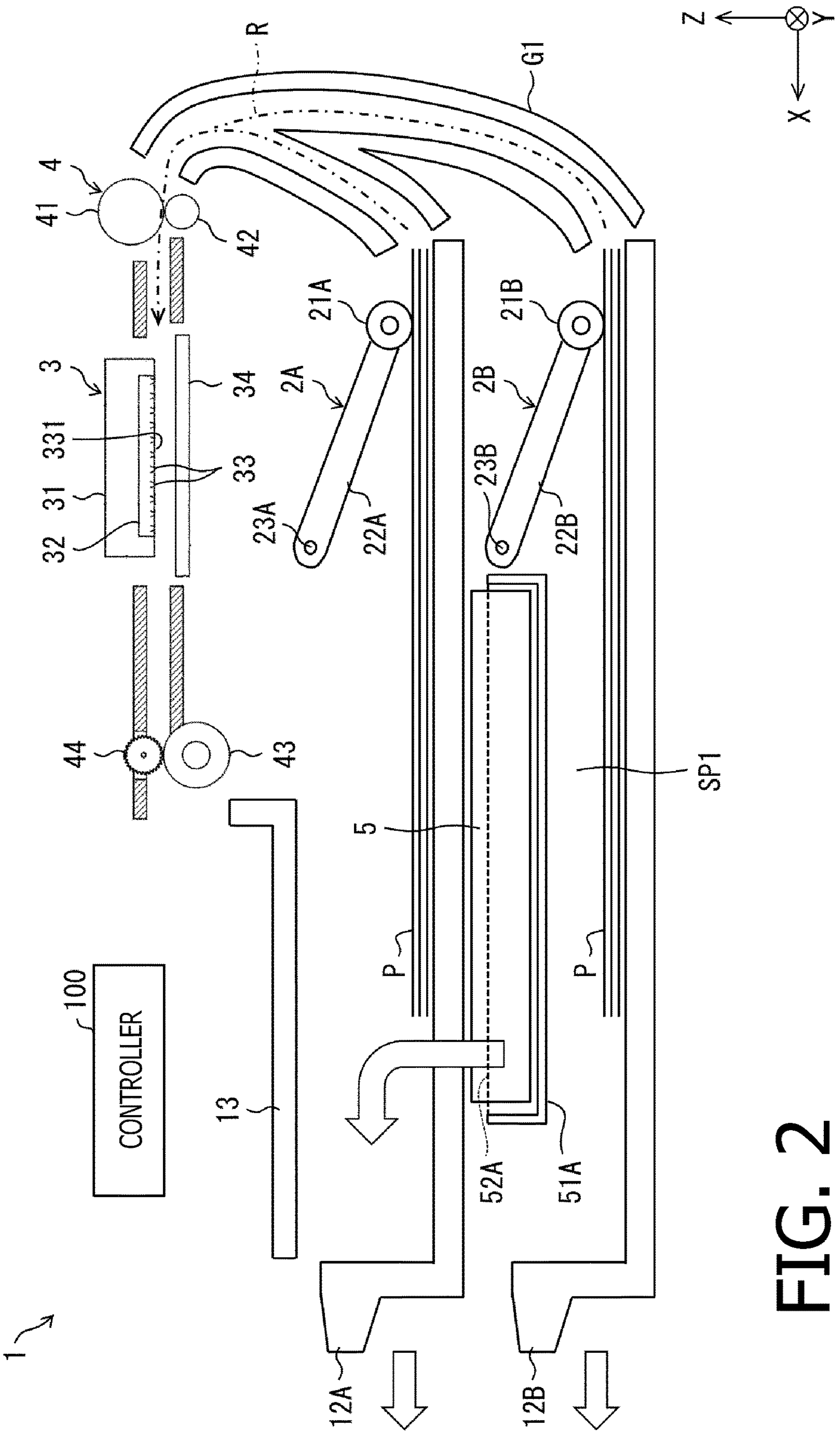
FIG. 2 is an illustrative cross-sectional view of an inner structure of the inkjet printer.

FIG. 1 is a perspective exterior view of an inkjet printer 1 according to a first embodiment of the present disclosure. FIG. 2 is an illustrative cross-sectional view of an inner structure of the inkjet printer 1. In the description below, a direction from a conveyer roller 41 toward a recorder 3 along an X-axis as shown in FIG. 2 will be called an X-axis direction. A direction from a second tray 12B toward a first tray 12A along a Z-axis as shown in FIG. 2 will be called a Z-axis direction. A direction, from one side toward the other side, e.g., from lower right toward upper-left in FIG. 1, intersecting orthogonally with the X-axis direction and the Z-axis direction will be called a Y-axis direction.

As shown in FIG. 1, the inkjet printer 1 has a housing 11, the first tray 12A, the second tray 12B, and an ejection tray 13. On a face of the housing 11 on a positive side in the X-axis direction, an opening 12AP, through which the first tray 12A may be attached to the housing 11, and an opening 12BP, through which the second tray 12B may be attached to the housing 11, are formed.

The first tray 12A may contain sheets P and is located above the second tray 12B. The sheets P may be, for example, but not necessarily be limited to, sheets of printing paper. For another example, the sheets P may be sheets of resin-made plastic printing medium such as OHP sheets. The first tray 12A is demountably mounted in the housing 11 through the opening 12AP.

The second tray 12B may contain sheets P and is located below the first tray 12A. The second tray 12B is demountably mounted in the housing 11 through the opening 12BP. The ejection tray 13 is located above the first tray 12A.

<Internal Configuration of Inkjet Printer 1>

As shown in FIG. 2, the inkjet printer 1 includes a first feeder unit 2A, a second feeder unit 2B, the recorder 3, a conveyer 4, a first waste liquid box 5, a holder 51A, and a controller 100.

<Configuration of First Feeder Unit 2A>

The first feeder unit 2A includes a feeder roller 21A, a feeder arm 22A, and a shaft 23A. The first feeder unit 2A may feed the sheets P stored in the first tray 12A to a conveyer path R by forwarding rotation of the feeder roller 21A. The conveyer path R includes paths starting from an end of the first tray 12A and an end of the second tray 12B on a negative side in the X-axis direction, extending toward a positive side in the Z-axis direction, curving in an area delimited by a guide member G1. The conveyer path R extends through an area including the recorder 3 to the ejection tray 13.

The feeder roller 21A is rotatably supported at a tip end of the feeder arm 22A. The feeder arm 22A is pivotably supported by a frame in the housing 11 through the shaft 23A. The feeder arm 22A is pivotably urged toward the first tray 12A by a weight thereof or by an elastic force of, for example, a spring.

The feeder roller 21A may, when a feeder motor (not shown) is activated by the controller 100, pick up the sheets P from the first tray 12A one by one. The sheets P picked up from the first tray 12A may be conveyed along the conveyer path R and fed to the recorder 3.

<Configuration of Second Feeder Unit 2B>

The second feeder unit 2B includes a feeder roller 21B, a feeder arm 22B, and a shaft 23B. The second feeder unit 2B may feed the sheets P stored in the second tray 12B to the conveyer path R by forwarding rotation of the feeder roller 21B.

The feeder roller 21B is rotatably supported at a tip end of the feeder arm 22B. The feeder arm 22B is pivotably supported by a frame in the housing 11 through the shaft 23B. The feeder arm 22B is pivotably urged toward the second tray 12B by a weight thereof or by an elastic force of, for example, a spring.

The feeder roller 21B may, when a feeder motor (not shown) is activated by the controller 100, pick up the sheets P from the second tray 12B one by one. The sheets P picked up from the second tray 12B may be conveyed along the conveyer path R and fed to the recorder 3.

<Configuration of Recorder 3>

The recorder 3 is located above the first feeder unit 2A. The recorder 3 includes a carriage 31, a recording head 32, and a platen 34. The carriage 31 may, when a driving force from a carriage motor (not shown) is transmitted thereto, move back and forth in a scanning direction, which coincides with the Y-axis direction, i.e., a direction of width of the sheet P being conveyed.

On the carriage 31, the recording head 32 for discharging liquid is mounted. The recording head 32 has a plurality of nozzles 33, through which ink is discharged at the sheet P. The recording head 32 may discharge ink droplets through the nozzles 33 by causing vibrating elements such as piezo elements to vibrate. The plurality of nozzles 33 are formed on a lower face of the recording head 32.

The plurality of nozzles 33 are arrayed in lines along the X-axis direction to form nozzle lines, and four (4) nozzle lines are formed on a nozzle surface 331 to align in the Y-axis direction. The nozzles 33 forming a first one of the nozzle lines, a second one of the nozzle lines, a third one of the nozzle lines, and a fourth one of the nozzle lines from one side toward the other side in the Y-axis direction, may discharge inks in colors of black, yellow, cyan, and magenta, respectively. However, the aligning order of the nozzle lines may not necessarily be limited but may be changed optionally, for example, on a product model basis.

The platen 34 is located below the recording head 32 at a position to face the nozzles 33. The platen 34 extends throughout or over the entire with of the sheet Pin the Y-axis direction. The platen 34 may support the sheet P from below while an image is being recorded on the sheet P. While the carriage 31 moves in the Y-axis direction over the sheet P supported by the platen 34, the recording head 32 may discharge the ink droplets selectively from the nozzles 33 to record the image on the sheet P.

<Configuration of Conveyer 4>

The conveyer 4 includes the conveyer roller 41 and an ejection roller 43, which are located on one side and the other side, respectively, of the carriage 31 and the platen 34 in the X-axis direction. At a position below the conveyer roller 41, a pinch roller 42 is arranged to face the conveyer roller 41. The conveyer roller 41 may be driven by a conveyer motor (not shown) to rotate. The pinch roller 42 may rotate along with the rotation of the conveyer roller 41. With forwarding rotation of the conveyer roller 41 and the pinch roller 42, the sheet P nipped between the conveyer roller 41 and the pinch roller 42 may be conveyed along the conveyer path R to the recorder 3.

The ejection roller 43 is located on a downstream side of the platen 34 in a conveying direction to convey the sheet P in the conveyer path R. At a position above the ejection roller 43, a spur roller 44 is arranged to face the ejection roller 43. The ejection roller 43 may be driven by a conveyer motor (not shown) to rotate. The spur roller 44 may rotate along with the rotation of the ejection roller 43. With forwarding rotation of the ejection roller 43 and the spur roller 44, the sheet P nipped between the ejection roller 43 and the spur roller 44 may be ejected from the conveyer path R to rest at the ejection tray 13.

<Configuration of First Waste Liquid Box 5>

The first waste liquid box 5 is a storage mountable in and demountable from the housing 11 and may store waste liquid discharged from the nozzles 33. The first waste liquid box 5 is located between the first tray 12A and the second tray 12B. In particular, the first waste liquid box 5 is located in a space SP1, which is created between the first tray 12A and the second tray 12B for locating the second feeder unit 2B between the first tray 12A and the second tray 12B.

The inkjet printer 1 having the first tray 12A and the second tray 12B may be capable of printing images on a larger number of sheets P than an inkjet printer having a single tray. Therefore, a capacity of the first waste liquid box 5 may need to be larger. In the inkjet printer 1 according to the present embodiment, the first waste liquid box 5 is located in the spare space SP1 between the first tray 12A and the second tray 12B. In this arrangement, the first waste liquid box 5 having a larger capacity may be provided without increasing a size of the inkjet printer 1 in the Z-axis direction, i.e., in the direction of height.

According to the present embodiment, moreover, the first waste liquid box 5 is located in the space, which is a remainder of the space created between the first tray 12A and the second tray 12B for locating the first feeder unit 2A between the first tray 12A and the second tray 12B. While the second feeder unit 2B occupies an area on the negative side in the X-axis direction in the space, the remainder area on the positive side in the X-axis direction may otherwise remain vacant. Thus, the remainder space is used efficiently.

Moreover, the first waste liquid box 5 is located at a position frontward with respect to the second feeder unit 2B, i.e., downstream in a direction toward the positive side in the X-axis direction, which is a direction to demount the first tray 12A from the housing 11. Therefore, a user may easily demount the first waste liquid box 5 from the housing 11 without interfering with the second feeder unit 2B.

<Configuration of Holder 51A>

The holder 51A supports the first waste liquid box 5. The holder 51A has an opening 52A, through which the first waste liquid box 5 is mountable and demountable, on an upper side. Therefore, the user may mount and demount the first waste liquid box 5 in and from the holder 51A through the opening 52A to exchange the first waste liquid box 5 with a new first waste liquid box 5.

The opening 52A in the holder 51A is located below the first tray 12A. Therefore, in a state where the first tray 12A is mounted in the housing 11, the user may not easily reach the first waste liquid box 5 supported by the holder 51A. Accordingly, the first waste liquid box 5 may be restrained from being removed by the user while the inkjet printer 1 is printing an image on the sheet P.

Moreover, the user may demount the first waste liquid box 5 through the opening 12AP being the same opening 12AP, through which the first tray 12A is demounted from the housing 11. Therefore, the first waste liquid box 5 may be demounted from the housing 11 in the same direction as the first tray 12A to be demounted from the housing 11, i.e., toward the positive side in the X-axis direction. Accordingly, working efficiency to exchange the first waste liquid box 5 may be improved.

The first waste liquid box 5 and the holder 51A are in an arrangement such that the position of the first waste liquid box 5 is steady when at least one of the first tray 12A and the second tray 12B is being mounted in or demounted from the housing 11. In particular, the first waste liquid box 5 is placed separately from the first tray 12A and from the second tray 12B, and the holder 51A is fixed to the housing 11.

In this arrangement, when the user mounts or demounts the first tray 12A or the second tray 12B in or from the housing 11, the first waste liquid box 5 may be restrained from moving along with the first tray 12A or the second tray 12B being mounted in or demounted from the housing 11 by the user. Therefore, the user may load the first tray 12A or the second tray 12B with the sheets P easily and may exchange the first waste liquid box 5 easily.

<Configuration of Controller 100>

The controller 100 includes a Central Processing Unit (CPU), a Read-Only Memory (ROM), a Random Access Memory (RAM), and Application Specific Integrated Circuit (ASIC) including a variety of controlling circuits. The controller 100 is connected with devices that compose the inkjet printer 1. The controller 100 is, moreover, connected with external devices such as a personal computer (PC) for communication.

The controller 100 may run programs stored in the ROM to cause the CPU and the ASIC to execute processes to control the devices. For example, the controller 100 may execute a printing process to print an image on the sheet P according to a printing command transmitted from the external device. It may be noted that the controller 100 may not necessarily consist of the CPU, the ROM, the RAM, and the ASIC alone but may consist of any hardware devices.

<Configuration of Inkjet Printer 1 Viewed from Upper Side and Front Side>

Figure 3:
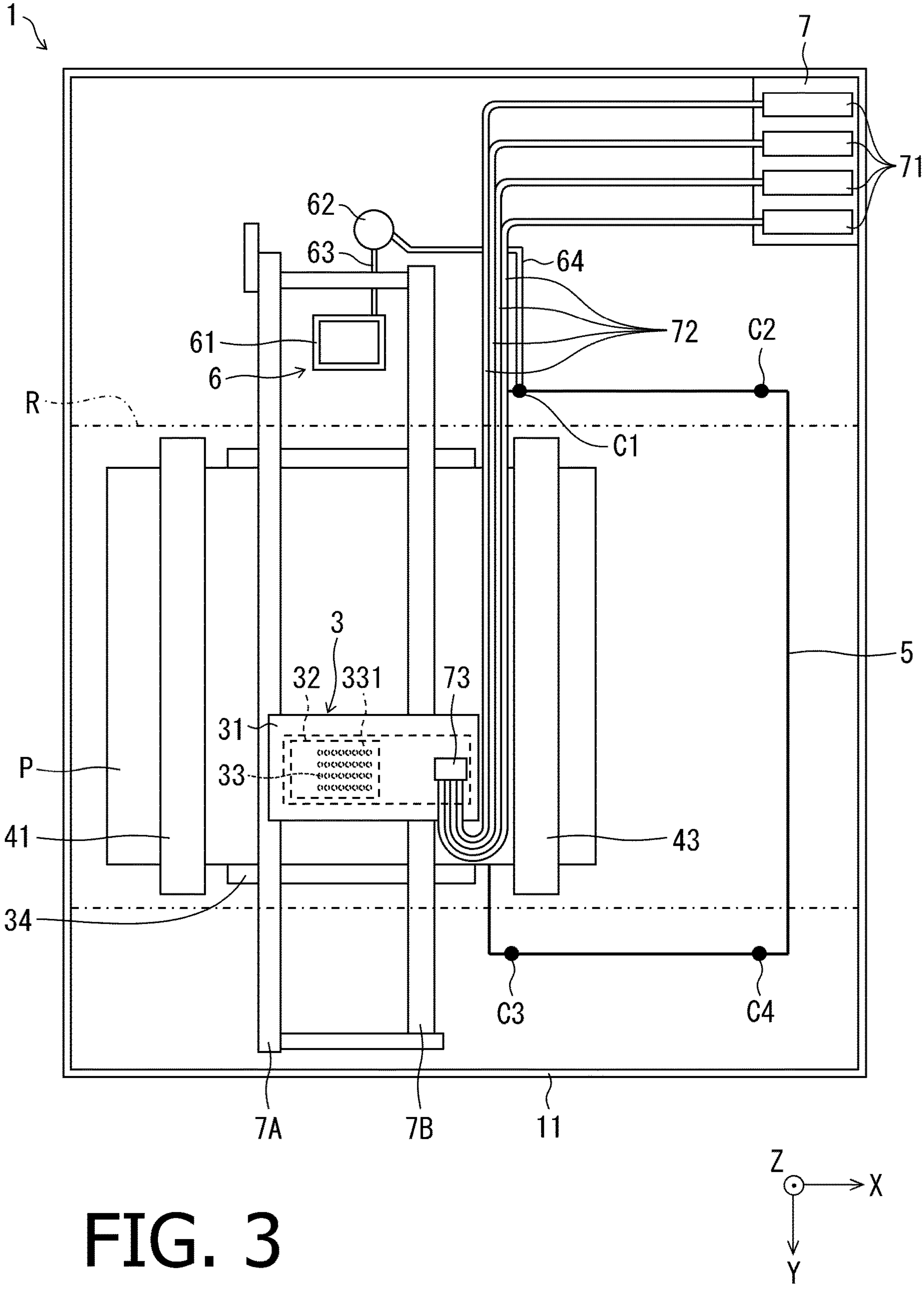
FIG. 3 is an illustrative top plan view of the inkjet printer.
Figure 4:
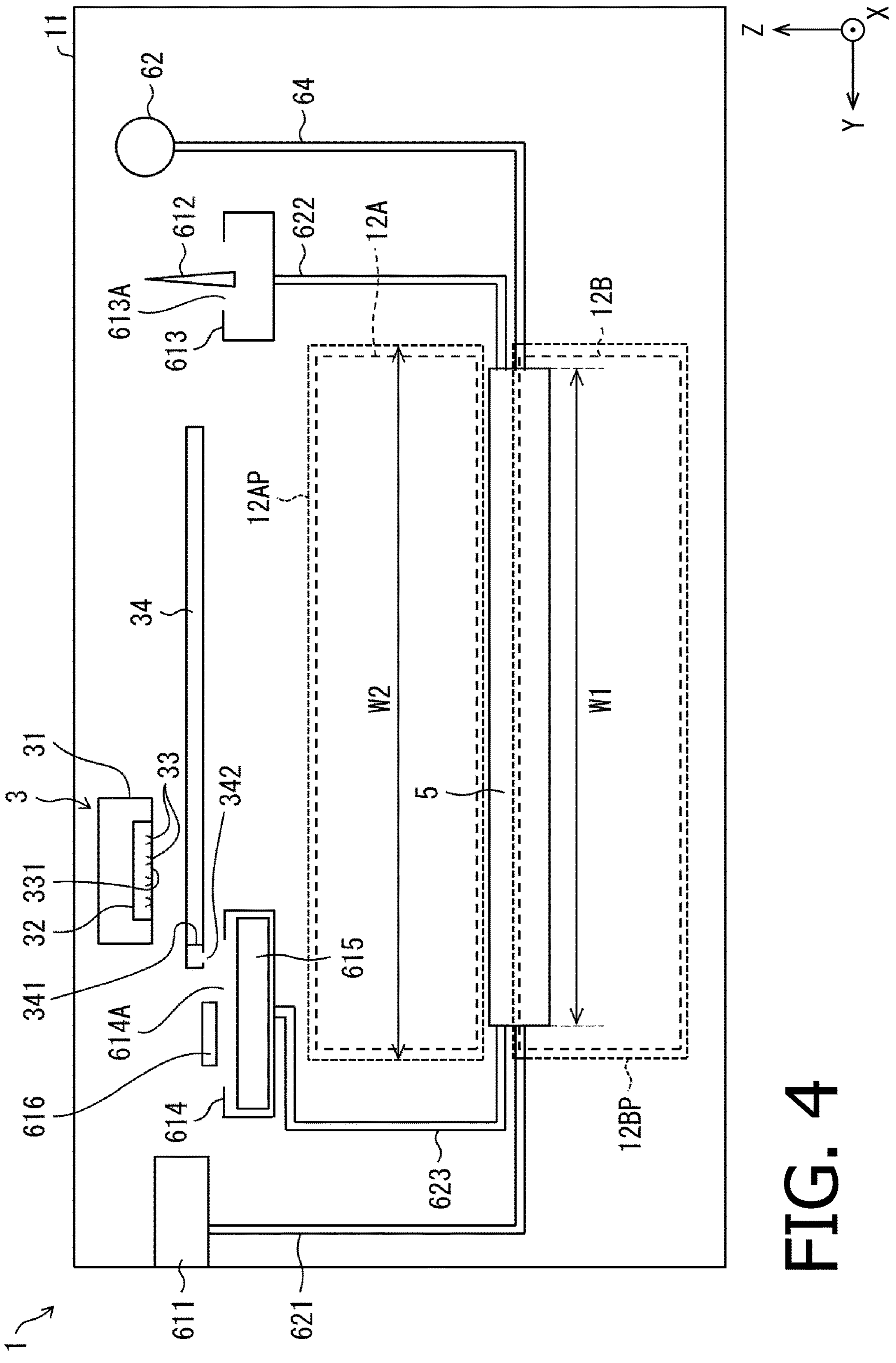
FIG. 4 is an illustrative view inside the inkjet printer viewed from a front side.

FIG. 3 is an illustrative top plan view of the inkjet printer 1. FIG. 4 is an illustrative view inside the inkjet printer 1 viewed from a front side. In FIG. 3, illustration of the housing 11 is omitted. As shown in FIG. 3, the inkjet printer 1 has a maintenance unit 6, a cartridge case 7, ink cartridges 71, and guide rails 7A, 7B. Further, as shown in FIG. 4, the inkjet printer 1 has a duct 611, a wiper 612, a liquid reservoir 613, an ink collecting container 614, and a flushing unit 616.

The cartridge case 7 has four (4) ink cartridges 71 aligning in the Y-axis direction. The ink cartridges 71 are detachably attached to the cartridge case 7. The ink cartridges 71 may contain inks in colors of black, yellow, cyan, and magenta.

The recorder 3 is connected with the ink cartridges 71 through supplying tubes 72, and the inks in the ink cartridges 171 may be supplied to the recorder 3 through the supplying tubes 72. The inks supplied from the ink cartridges 171 may be stored in a buffer tank (not shown) in the recorder 3. Compartments (not shown) inside the buffer tank are continuous with the nozzles 33.

The buffer tank has a tube joint 73, which is formed integrally with the buffer tank. To the tube joint 73, ends of the supplying tubes 72 are detachably attached. The other ends of the supplying tubes 72 are connected to the ink cartridges 171.

As shown in FIG. 3, the guide rails 7A, 7B extending in parallel with the Y-axis direction are arranged above the platen 34. The carriage 31 is supported by the guide rails 7A, 7B. The carriage 31 may move along the guide rails 7A, 7B in the Y-axis direction in an area where the carriage 31 faces the platen 34. Optionally, a single guide rail rather than two guide rails 7A, 7B may be provided.

<Configuration of Maintenance Unit 6>

As shown in FIG. 3, the maintenance unit 6 is located at a position on a negative side of the platen 34 in the Y-axis direction. The maintenance unit 6 includes a cap 61, a pump 62, and a waste liquid tube 63.

The maintenance unit 6 may perform maintenance works on the recording head 32 to maintain operable condition of the recording head. In particular, the maintenance unit 6 may perform a purging action to suction the inks in the nozzles 33 as a maintenance act. In other words, the maintenance unit 6 may collect the inks discharged from the nozzles 33 of the recording head 32.

The cap 61 may be formed of, for example, rubber. The cap 61 is located at a position to face the recording head 32 during the maintenance action to receive ink being waste liquid discharged from the nozzles 33. The pump 62 may be driven by a driving motor (not shown) to suction the waste liquid from the nozzles 33.

The waste liquid tube 63 connects the cap 61 and the pump 62. The waste liquid tube 63 forms a flow path, in which the waste liquid may be transported from the cap 61 to the pump 62. As shown in FIGS. 3-4, the first waste liquid box 5 is connected to the pump 62 through the waste liquid tube 64.

The waste liquid suctioned by the pump 62 may be ejected through the waste liquid tube 64 into the first waste liquid box 5. Thus, the first waste liquid box 5 may store the waste liquid collected by the maintenance unit 6. The first waste liquid box 5 and the waste liquid tube 64 may be connected at, for example, a connecting point C1. The connecting point C1 is located on a negative side of the first waste liquid box 5 in the X-axis direction and on a negative side of the first waste liquid box 5 in the Y-axis direction. In other words, the connecting point C1 is on a side of the first waste liquid box 5 toward the maintenance unit 6.

<Configuration of Duct 611>

The duct 611 may suction mist of liquid produced in the housing 11. The mist of liquid to be suctioned by the duct 611 includes mist of ink discharged from the nozzles 33. Thus, the duct 611 may collect the waste liquid by suction the mist of liquid. The duct 611 is located at a position on the positive side in the Y-axis direction in the housing 11.

The duct 611 includes a fan and a conduit, which are not shown. The fan may expel air inside the housing 11 to the outside of the housing 11 through an air outlet, which is not shown. The conduit is a passage, through which the air suctioned from inside of the housing 11 may be transported to the air outlet.

The duct 611 is connected to the first waste liquid box 5 through the waste liquid tube 621. In other words, the waste liquid collected by the duct 611 may be ejected into the first waste liquid box 5 through the waste liquid tube 621. Thus, the mist of ink produced in the housing 11 may be collected by the duct 611 and may be stored in the first waste liquid box 5 as waste liquid.

<Configuration of Wiper 612>

The wiper 612 may wipe the nozzle surface 331 of the recording head 32 to remove the ink from the nozzles 33. In other words, the wiper 612 may collect the ink adhered to the nozzles 33 by wiping the nozzle surface 331. The wiper 612 may be made of rubber. The wiper 612 is located to be lower than the recording head 32. The wiper 612 is located between the platen 34 and the maintenance unit 6 in the Y-axis direction.

An edge of the wiper 612 may contact the nozzle surface 331 of the recording head 32. The wiper 612 is movable in the Z-axis direction. When the inkjet printer 1 records an image, the wiper 612 moves downward to a position where the wiper 612 may not contact the nozzle surface 331. After the maintenance unit 6 suctions the ink from the nozzles 33, the wiper 612 may move upward to a position where the wiper 612 contacts the nozzle surface 331.

The wiper 612 moved to the upper position may contact the nozzle surface 331 of the recording head 32 that runs on the wiper 612. Thereby, the wiper 612 may wipe the nozzle surface 331 and remove the ink being the waste liquid adhered to the nozzles 33. The ink removed from the nozzles 33 by the wiper 612 may flow on the wiper 612 into the liquid reservoir 613.

<Configuration of Liquid Reservoir 613>

The liquid reservoir 613 is located below the wiper 612. The liquid reservoir 613 may store the ink removed by the wiper 612 from the nozzles 33. In other words, the liquid reservoir 613 may collect the ink being waste liquid. The liquid reservoir 613 is formed to have an opening 613A on an upper side thereof. The ink removed by the wiper 612 may fall through the opening 613A of the liquid reservoir 613 to be stored in the liquid reservoir 613.

The liquid reservoir 613 is connected with the first waste liquid box 5 through a waste liquid tube 622. The ink collected in the liquid reservoir 613 may be transported through the waste liquid tube 622 to the first waste liquid box 5. Thus, the ink adhered to the nozzles 33 may be wiped by the wiper 612 and stored in the first waste liquid box 5.

<Configuration of Platen 34 to Collect Ink Being Waste Liquid>

The platen 34 may collect waste liquid, i.e., the ink discharged from the nozzles 33 onto the platen 34. The platen 34 has a slant surface, which slants to be lower toward the negative side in the X-axis direction. the platen 34 has a waste liquid chute 341 to collect the ink being waste liquid flowing down along the slant surface of the platen 34. The waste liquid chute 341 may consist of, for example, gutters or grooves.

The waste liquid chute 341 is arranged in an end area on a negative side of the platen 34 in the X-axis direction and in an end area on a positive side in the Y-axis positive direction, approximately in a form of L. The waste liquid chute 341 has a form, in which the collected ink may flow down toward a liquid outlet 342, which is formed on a lower side of the platen 34.

An ink collecting container 614 is located at a position on a positive side of the platen 34 in the Y-axis direction and lower than the platen 34. The ink collecting container 614 is located below the liquid outlet 342. The ink collecting container 614 has an opening 614A. The ink flowing through the waste liquid chute 341 may fall through the liquid outlet 342 and the opening 614A into the ink collecting container 614.

<Configuration of Ink Collecting Container 614>

The ink collecting container 614 may receive and collect the ink being waste liquid drained from the waste liquid chute 341 of the platen 34. In other words, the ink collecting container 614 may collect the ink being waste liquid discharged from the nozzles 33.

The ink collecting container 614 has a waste liquid absorber 615 inside. The waste liquid absorber 615 may absorb the waste liquid received in the ink collecting container 614. The waste liquid absorber 615 may be made of, for example, unwoven fabric, sponge, or cotton that may absorb the liquid. The ink collecting container 614 is connected to the first waste liquid box 5 through a waste liquid tube 623. The waste liquid discharged from the ink collecting container 614 may be transported through the waste liquid tube 623 and stored in the first waste liquid box 5.

<Configuration of Flushing Unit 616>

The flushing unit 616 has a waste liquid guide and a guide retainer frame, which are not shown. The flushing unit 616 may prevent the ink discharged from the nozzles 33 from scattering in mist during a flushing process and guide the ink to be collected in the ink collecting container 614. In other words, the flushing unit 616 may collect the ink being waste liquid.

The flushing process is an action, in which the controller 100 operates the recording head 32 to discharge the ink from the nozzles 33 at the waste liquid guide through a predetermined flushing area, rather than discharging the ink at the sheet P. The flushing area is an area on an upper side of the flushing unit 616. The controller 100 may move the carriage 31 at a flushing position, at which the recording head 32 faces toward the flushing area, and operate the recording head 32 to discharge the ink thereat.

For preventing the ink discharged in the flushing process from scattering in mist, the waste liquid guide has a slant surface spreading in a direction to intersect with the vertical direction, in which the ink is discharged, e.g., the Z-axis direction. The ink discharged in the flushing process may land on the slant surface of the waste liquid guide and may be guided along the slant surface to the waste liquid absorber 615 located inside the ink collecting container 614 through the opening 614A.

The guide retainer frame is a frame, to which the waste liquid guide is fixed, and has a substantially rectangular form in a top plan view. The waste liquid guide is fixed to the housing 11 by, for example, being fastened with screws. An upper face of the guide retainer frame forms the flushing area mentioned above.

<Width W1 of the First Waste Liquid Box 5>

As shown in FIG. 4, a width W1 of the first waste liquid box 5 in a widthwise direction, which coincides with the Y-axis direction, is smaller than or equal to a width W2 of the opening 12AP. The widthwise direction is parallel to the nozzle surface 331 of the recording head 32 and intersects orthogonally with a mounting/demounting direction of the first tray 12A. With the first waste liquid box 5 having the width W1 smaller than or equal to the width W2 of the opening 12AP, through which the first tray 12A is mountable in and demountable from the housing 11, the user may mount or demount the first waste liquid box 5 in and from the housing 11 through the opening 12AP, through which the first tray 12A is mountable and demountable.

First Modified Example

Figure 5A:
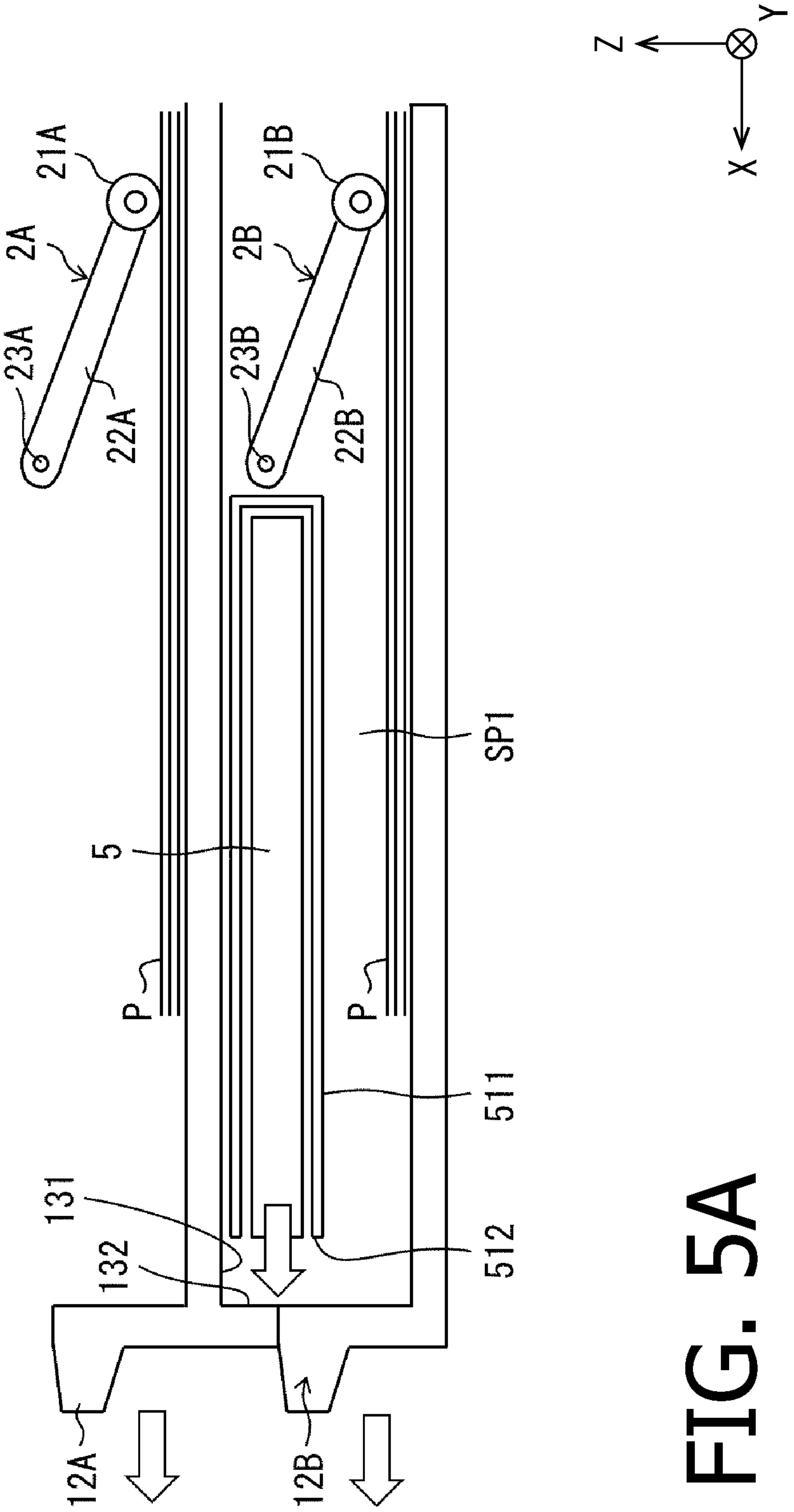
FIG. 5A, FIG. 5B and FIG. 5C are cross-sectional views of parts including a first tray and a second tray in inkjet printers.

FIG. 5A is a cross-sectional view of a part of the inkjet printer 1 including the first tray 12A and the second tray 12B according to a first modified example of the embodiment of the present disclosure. As shown in FIG. 5A, the inkjet printer 1 in the first modified example differs from the inkjet printer 1 in the first embodiment described above in that the inkjet printer 1 in the first modified example has a holder 511 in place of the holder 51A and that the first tray 12A has a protrusion 132.

The protrusion 132 extends downward from a bottom surface 131 of the first tray 12A. The protrusion 132 is located on a positive side of the first tray 12A in the X-axis direction. The holder 511 supports the first waste liquid box 5. On a positive side of the holder 511 in the X-axis direction, an opening 512 is formed. Through the opening 512, the first waste liquid box may be mounted in or demounted from the housing 11.

The opening 512 formed in the holder 511 at least partly overlap the protrusion 132 of the first tray 12A in the mounting/demounting direction of the first waste liquid box 5, i.e., the X-axis direction. Meanwhile, the opening 512 may or may not overlap the second tray 12B partly in the mounting/demounting direction of the first waste liquid box 5. In FIG. 5A, the opening 512 partly overlaps the second tray 12B in the mounting/demounting direction of the first waste liquid box 5.

According to the configuration of the first modified example, in the condition where the first tray 12A is mounted in the housing 11, the user may not easily reach the first waste liquid box 5 supported by the holder 511. Accordingly, the first waste liquid box 5 may be restrained from being removed by the user while the inkjet printer 1 is printing an image on the sheet P.

Optionally, the holder 51B in an inkjet printer 1A (see FIG. 6) according to a second embodiment, which will be described later, may be replaced with the holder 511. In this arrangement, the holder 511 may support a second waste liquid box 5A. Moreover, the opening 512 formed in the holder 511 may at least partly overlap the protrusion of the second tray 12B in a mounting/demounting direction of the second waste liquid box 5A. The holder 51B in the inkjet printer 1A will be described further below.

Second Modified Example

Figure 5B:
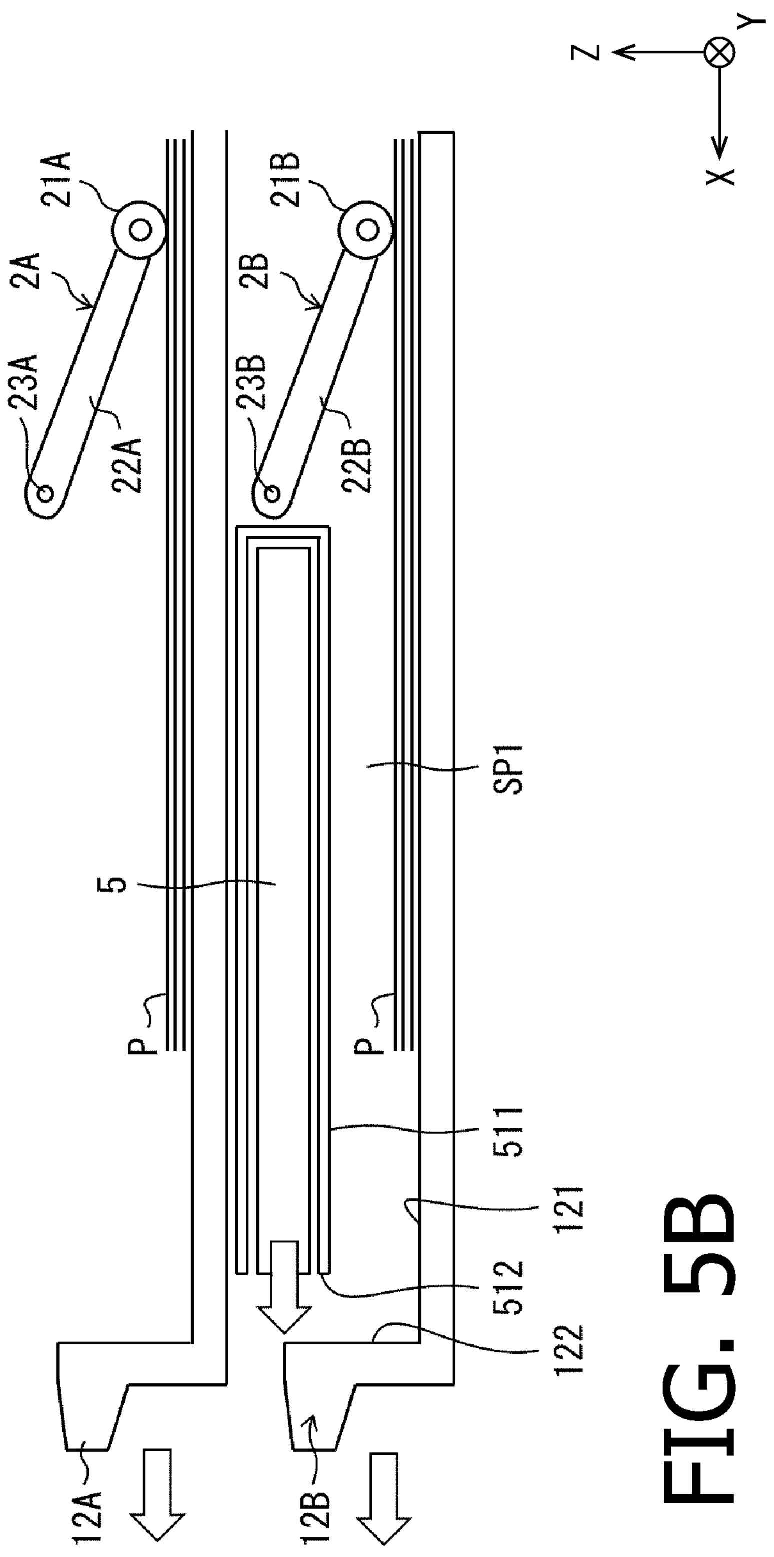

FIG. 5B is a cross-sectional view of a part of the inkjet printer 1 including the first tray 12A and the second tray 12B according to a second modified example of the embodiment of the present disclosure.

As shown in FIG. 5B, the inkjet printer 1 in the second modified example differs from the inkjet printer 1 in the first modified example described above in that the first tray 12A in the second modified example does not have the protrusion 132.

The second tray 12B has a supporting surface 121 to support the sheets P thereon and a side wall 122 extending upward from the supporting surface 121. The side wall 122 is located at an end of the supporting surface 121 on the positive side in the X-axis direction. The opening 512 formed in the holder 511 at least partly overlap the side wall 122 of the second tray 12B in the mounting/demounting direction of the first waste liquid box 5.

According to the configuration of the second modified example, in the condition where the second tray 12B is mounted in the housing 11, the user may not easily reach the first waste liquid box 5 supported by the holder 511. Accordingly, the first waste liquid box 5 may be restrained from being removed by the user while the inkjet printer 1 is printing an image on the sheet P.

Moreover, the user may demount the first waste liquid box 5 through the opening 12AP being the same opening 12BP, through which the second tray 12B is demounted from the housing 11. Therefore, the first waste liquid box 5 may be demounted from the housing 11 in the same direction as the second tray 12B to be demounted from the housing 11, i.e., toward the positive side in the X-axis direction. Accordingly, working efficiency to exchange the first waste liquid box 5 may be improved. Optionally, on the end of the holder 511 on the positive side in the X-axis direction, a cover that may close the opening 512 may be provided.

For example, the holder 51B in the inkjet printer 1A (see FIG. 6) according to the second embodiment, which will be described below, may be replaced with the holder 511. In this arrangement, the opening 512 formed in the holder 511 may at least partly overlap a side wall of a third tray 12C in the mounting/demounting direction of a second waste liquid box 5A, which will be described further below.

Third Modified Example

Figure 5C:
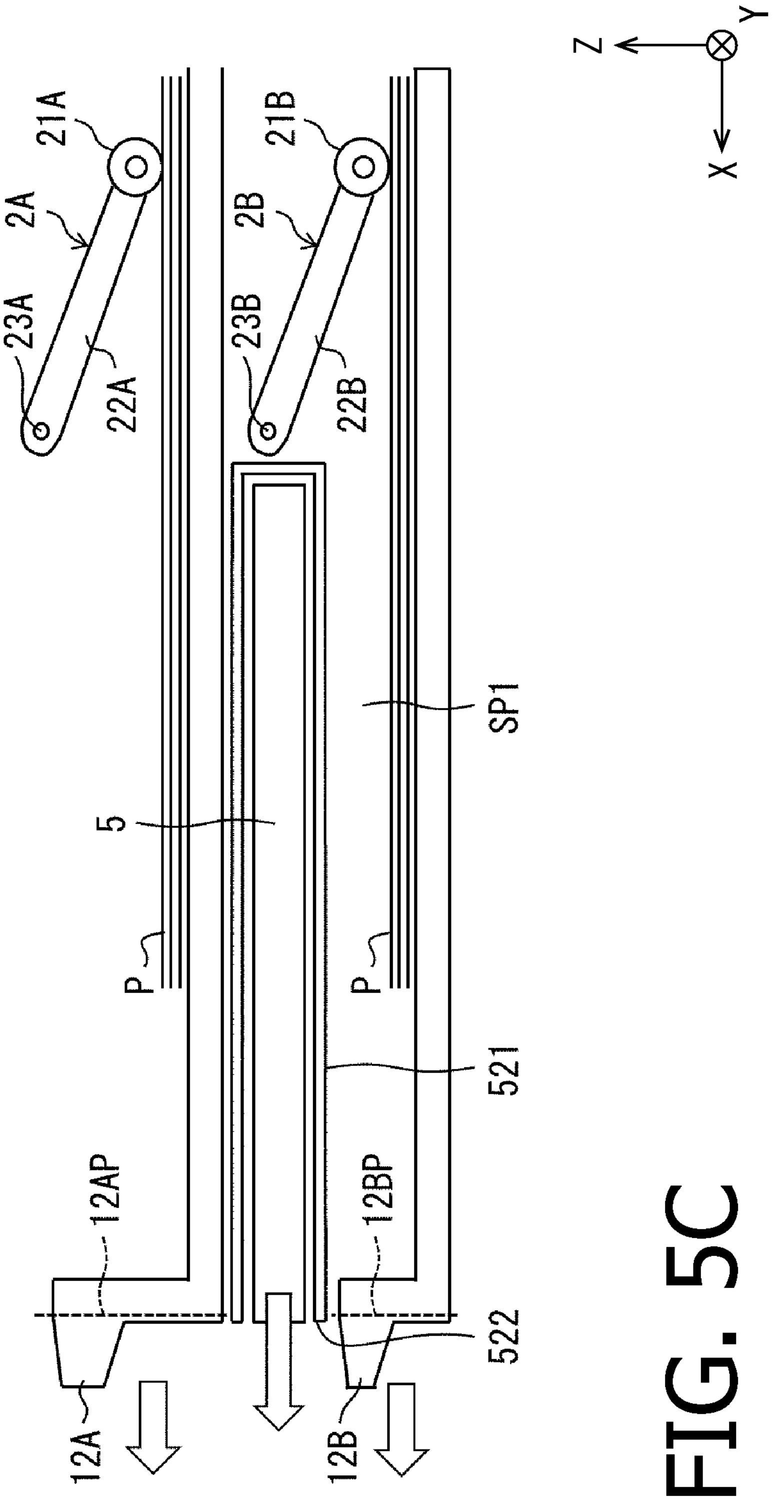

FIG. 5C is a cross-sectional view of a part of the inkjet printer 1 including the first tray 12A and the second tray 12B according to a third modified example of the embodiment of the present disclosure. The inkjet printer 1 in the third modified example differs from the inkjet printer 1 in the first embodiment described above in that the inkjet printer 1 in the third modified example has a holder 521 in place of the holder 51A.

The holder 521 supports the first waste liquid box 5. On a positive side of the holder 521 in the X-axis direction, an opening 522 is formed. The opening 522 of in the holder 521 is formed on a face of the housing 11 on the positive side in the X-axis direction and is located between the opening 12AP and the opening 12BP.

In this arrangement, the user may remove the first waste liquid box 5 from the holder 521 without removing the first tray 12A or the second tray 12B from the housing 11. Therefore, the user may exchange the first waste liquid box 5 easily. Optionally, on an end of the holder 521 on the positive side in the X-axis direction, a cover that may close the opening 522 may be provided.

Optionally, the holder 51B in the inkjet printer 1A (see FIG. 6) according to the second embodiment, which will be described below, may be replaced with the holder 521. In this arrangement, the holder 521 may support the second waste liquid box 5A, which will be described below, and the opening 522 formed in the holder 521 may be located between the opening 12BP and an opening (not shown), through which the third tray 12C is mounted in or demounted from the housing 11.

Second Embodiment

Figure 6:
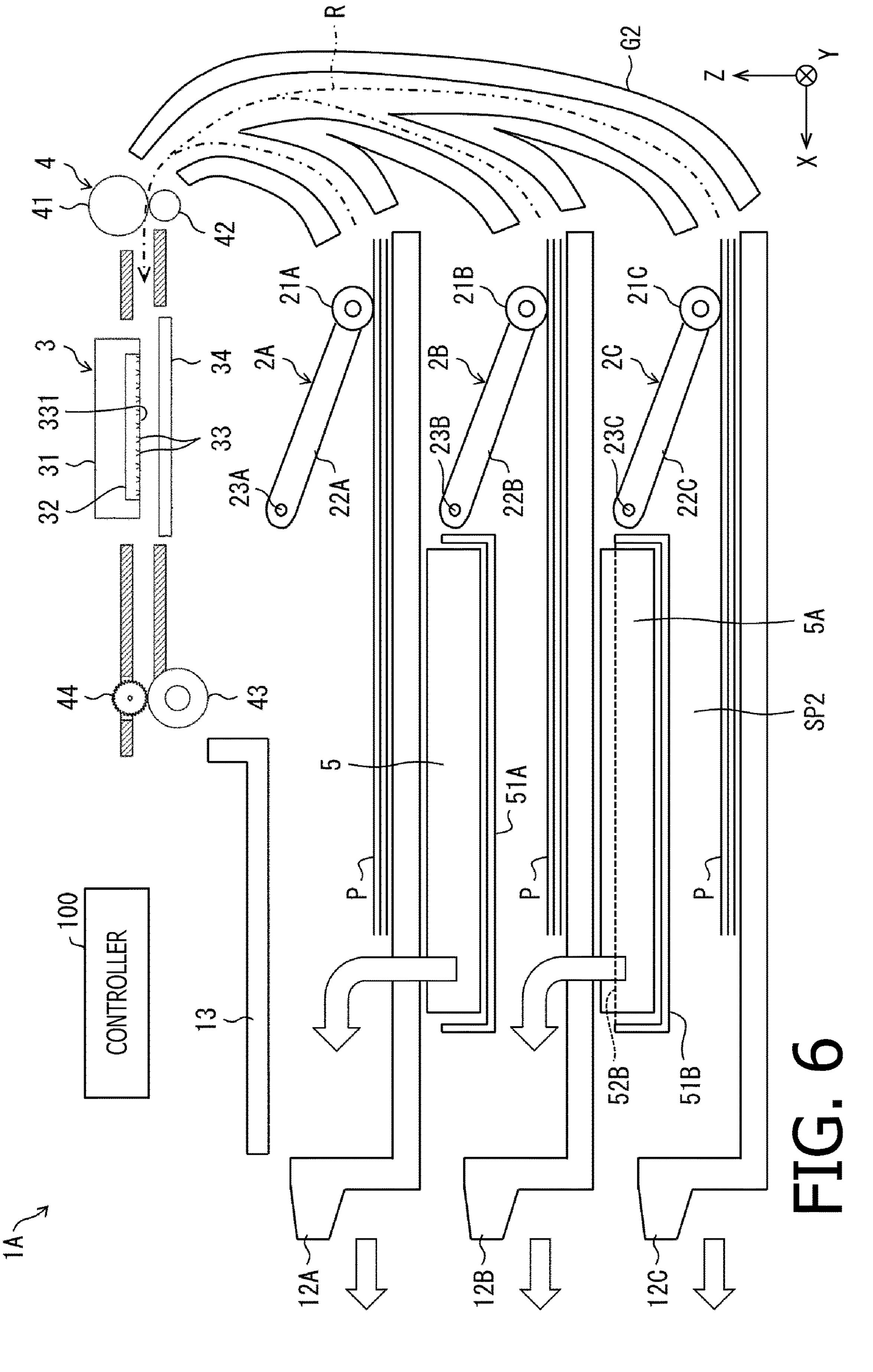
FIG. 6 is a cross-sectional view to illustrate an inner structure of an inkjet printer.

The second embodiment of the present disclosure will be described below. In the following paragraphs, items that are substantially identical to those described above will be referred to by the same reference signs, and description of those items is herein omitted. FIG. 6 is a cross-sectional view to illustrate an inner structure of the inkjet printer 1A according to the second embodiment.

As shown in FIG. 6, the inkjet printer 1A differs from the inkjet printer 1 of the first embodiment in that the inkjet printer 1A has the third tray 12C, a third feeder unit 2C, the second waste liquid box 5A, and the holder 51B. The third tray 12C may contain sheets P and is located below the second tray 12B. The third tray 12C is mountable in and demountable from the housing 11 through an opening (not shown), through which the third tray 12C is mountable in the housing 11.

<Configuration of Third Feeder Unit 2C>

The third feeder unit 2C includes a feeder roller 21C, a feeder arm 22C, and a shaft 23C. The third feeder unit 2C may feed the sheets P stored in the third tray 12C to the conveyer path R by forwarding rotation of the feeder roller 21C.

The conveyer path R includes paths starting from ends of the first tray 12A, the second tray 12B, and the third tray 12C on the negative side in the X-axis direction, extending toward the positive side in the Z-axis direction, curving in an area delimited by a guide member G2. The conveyer path R extends through the area including the recorder 3 to the ejection tray 13.

The feeder roller 21C is rotatably supported at a tip end of the feeder arm 22C. The feeder arm 22C is pivotably supported by a frame in the housing 11 through the shaft 23C. The feeder arm 22C is pivotably urged toward the third tray 12C by a weight thereof or by an elastic force of, for example, a spring.

The feeder roller 21C may, when a feeder motor (not shown) is activated by the controller 100, pick up the sheets P from the third tray 12C one by one. The sheets P picked up from the third tray 12C may be conveyed along the conveyer path R and fed to the recorder 3.

<Configuration of Second Waste Liquid Box 5A>

The second waste liquid box 5A is mountable in and demountable from the housing 11 and may store the waste liquid discharged from the nozzles 33. In particular, the second waste liquid box 5A may store the waste liquid collected by the maintenance unit 6. The second waste liquid box 5A is located between the second tray 12B and the third tray 12C. In particular, the second waste liquid box 5A is located in a space SP2, which is created between the second tray 12B and the third tray 12C for locating the third feeder unit 2C between the second tray 12B and the third tray 12C.

Thus, the waste liquid boxes 5, 5A may be arranged in, not only in the spare space SP1 between the first tray 12A and the second tray 12B, but also in the spare space SP2 between the second tray 12B and the third tray 12C. Therefore, with the plurality of waste liquid boxes 5, 5A, a larger amount of waste liquid may be stored in the inkjet printer 1A. Moreover, the second waste liquid box 5A is located at a position frontward with respect to the third feeder unit 2C, i.e., downstream in the direction toward the positive side in the X-axis direction, which is the direction to demount the second tray 12B from the housing 11. Meanwhile, in the widthwise direction, i.e., the Y-axis direction, a width of the second waste liquid box 5A is smaller than or equal to a width of the opening 12BP.

<Configuration of Holder 51B>

The holder 51B supports the second waste liquid box 5A. The holder 51B has an opening 52B, through which the second waste liquid box 5A is mountable and demountable, on an upper side. The opening 52B formed in the holder 51B is located below the second tray 12B. The second waste liquid box 5A and the holder 51B are in an arrangement such that the position of the second waste liquid box 5A is steady when at least one of the second tray 12B and the third tray 12C is being mounted in or demounted from the housing 11. In particular, the second waste liquid box 5A is placed separated from the second tray 12B and from the third tray 12C, and the holder 51B is fixed to the housing 11.

<Configuration of Inkjet Printer 1A Viewed from Front Side>

Figure 7:
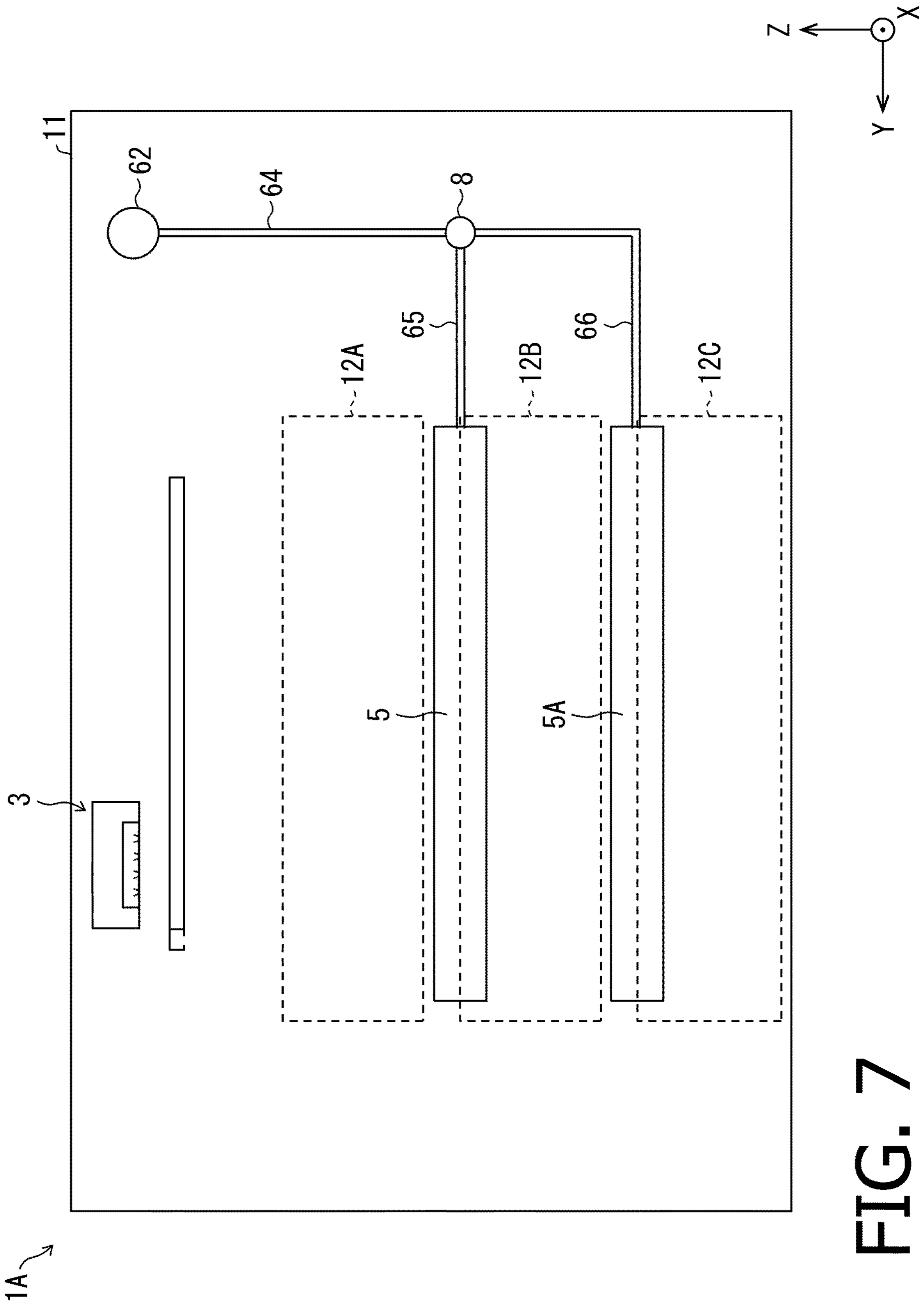
FIG. 7 is an illustrative view inside the inkjet printer viewed from a frontside.

FIG. 7 is an illustrative view inside the inkjet printer 1A viewed from a front side. In FIG. 7, illustration of the duct 611, the wiper 612, the liquid reservoir 613, the ink collecting container 614, and the flushing unit 616 is omitted. As shown in FIG. 7, the inkjet printer 1A differs from the inkjet printer 1 in that a switcher 8 is provided.

The switcher 8 is connected to the pump 62 in the maintenance unit 6 through the waste liquid tube 64 and to the first waste liquid box 5 through a waste liquid tube 65. The switcher 8 may be, for example, a three-way valve to switch flow paths for the waste liquid to flow by changing positions of a valve body.

The waste liquid tubes 64, 65 and the switcher 8 form a first flow path, in which the waste liquid from the pump 62 may flow to the first waste liquid box 5. The waste liquid tubes 64, 66 and the switcher 8 form a second flow path, in which the waste liquid from the pump 62 may flow to the second waste liquid box 5A.

The switcher 8 may switch the flow paths for the waste liquid between the first low path and the second flow path based on controlling signals from the controller 100. Therefore, for example, once the first waste liquid box 5 is filled with the waste liquid, the switcher 8 may switch the flow paths from the first flow path to the second flow paths, and the waste liquid may be further stored in the second waste liquid box 5A.

The waste liquid tubes 64, 65, 66, and the switcher 8 are located outside a range, in which the first tray 12A, the second tray 12B, and the third tray 12C occupy. Therefore, the user may mount or demount the first tray 12A, the second tray 12B, or the third tray 12C without causing the first tray 12A, the second tray 12B, or the third tray 12C to interfere with the waste liquid tubes 64, 65, 66 or the switcher 8. Accordingly, the user may load the first tray 12A, the second tray 12B, and the third tray 12C with the sheets P easily.

Fourth Modified Example

Optionally, in the inkjet printer 1A shown in FIG. 7, the switcher 8 may be connected through the waste liquid tube 64 to the duct 611, the liquid reservoir 613, the platen 34, or the ink collecting container 614 shown in FIG. 4, rather than the pump 62, to collect the waste liquid. For another example, optionally, the switcher 8 may be connected through the waste liquid tube 64 to an intermediate box 617 (see FIG. 9), which will be described below, in an inkjet printer 1C in a fourth embodiment of the present disclosure, rather than the pump 62, to collect the waste liquid.

Third Embodiment

Figure 8:
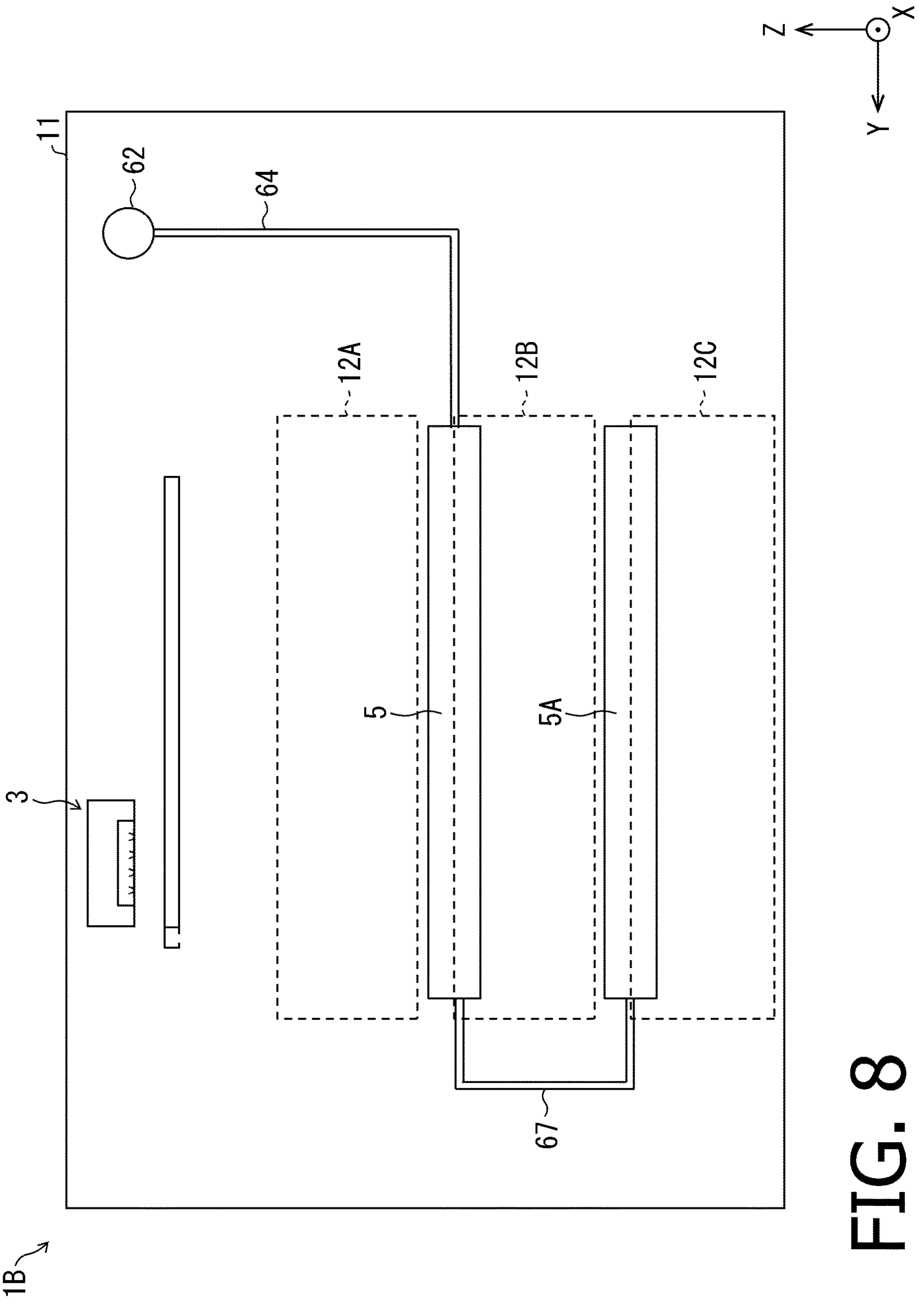
FIG. 8 is an illustrative view inside the inkjet printer viewed from a frontside.

A third embodiment of the present disclosure will be described below. In the following paragraphs, items that are substantially identical to those described above will be referred to by the same reference signs, and description of those items is herein omitted. FIG. 8 is a cross-sectional view to illustrate an inner structure of an inkjet printer 1B according to the third embodiment.

In FIG. 8, illustration of the duct 611, the wiper 612, the liquid reservoir 613, the ink collecting container 614, and the flushing unit 616 is omitted. As shown in FIG. 8, the inkjet printer 1B differs from the inkjet printer 1A in that the inkjet printer 1B is not provided with the switcher 8 and that the first waste liquid box 5 and the second waste liquid box 5A are connected through a waste liquid tube 67.

The first waste liquid box 5 is connected to the pump 62 in the maintenance unit 6 through the waste liquid tube 64. The second waste liquid box 5A is connected to the first waste liquid box 5 through the waste liquid tube 67. In other words, the first waste liquid box 5 and the second waste liquid box 5A are connected serially. The second waste liquid box 5A may store the waste liquid discharged from the first waste liquid box 5.

According to this configuration, the waste liquid collected by the maintenance unit 6 may be stored in the first waste liquid box 5, and the waste liquid discharged from the first waste liquid box 5 may be stored in the second waste liquid box 5A. Thus, with the plurality of waste liquid boxes 5, 5A, a larger amount of waste liquid may be stored in the inkjet printer 1B. Moreover, the waste liquid ejected from the first waste liquid box 5 may be stored in the second waste liquid box 5A; therefore, the user may not need to exchange the first waste liquid box 5 but exchange solely the second waste liquid box 5A.

Moreover, the waste liquid tube 67 is located outside a range, in which the first tray 12A, the second tray 12B, and the third tray 12C occupy. Therefore, the user may mount or demount the first tray 12A, the second tray 12B, or the third tray 12C without causing the first tray 12A, the second tray 12B, or the third tray 12C to interfere with the waste liquid tube 67. Accordingly, the user may load the first tray 12A, the second tray 12B, and the third tray 12C with the sheets P easily.

The waste liquid tube 67 and the first waste liquid box 5 may be connected at, for example, any one of connecting points C2-C4 as shown in FIG. 3. The connecting point C2 is a position in the first waste liquid box 5 on the positive side in the X-axis direction and on the negative side in the Y-axis direction. The connecting point C3 is a position in the first waste liquid box 5 on the negative side in the X-axis direction and on the positive side in the Y-axis direction. The connecting point C4 is a position in the first waste liquid box 5 on the positive side in the X-axis direction and on the positive side in the Y-axis direction.

Fifth Modified Example

Optionally, in the inkjet printer 1B shown in FIG. 8, the first waste liquid box 5 and the second waste liquid box 5A may be connected through a waste liquid absorber (not shown) rather than the waste liquid tube 67. For another example, optionally, a path formed of resin may replace the waste liquid tube 67 to connect the first waste liquid box 5 and the second waste liquid box 5A.

Sixth Modified Example

Optionally, in the inkjet printer 1B shown in FIG. 8, the first waste liquid box 5 may be connected through the waste liquid tube 64 to the duct 611, the liquid reservoir 613, the platen 34, or the ink collecting container 614 shown in FIG. 4, rather than the pump 62, to collect the waste liquid. For another example, optionally, the first waste liquid box 5 may be connected through the waste liquid tube 64 to the intermediate box 617 (see FIG. 9), which will be described below, in the inkjet printer 1C in the fourth embodiment of the present disclosure, rather than the pump 62, to collect the waste liquid.

Fourth Embodiment

Figure 9:
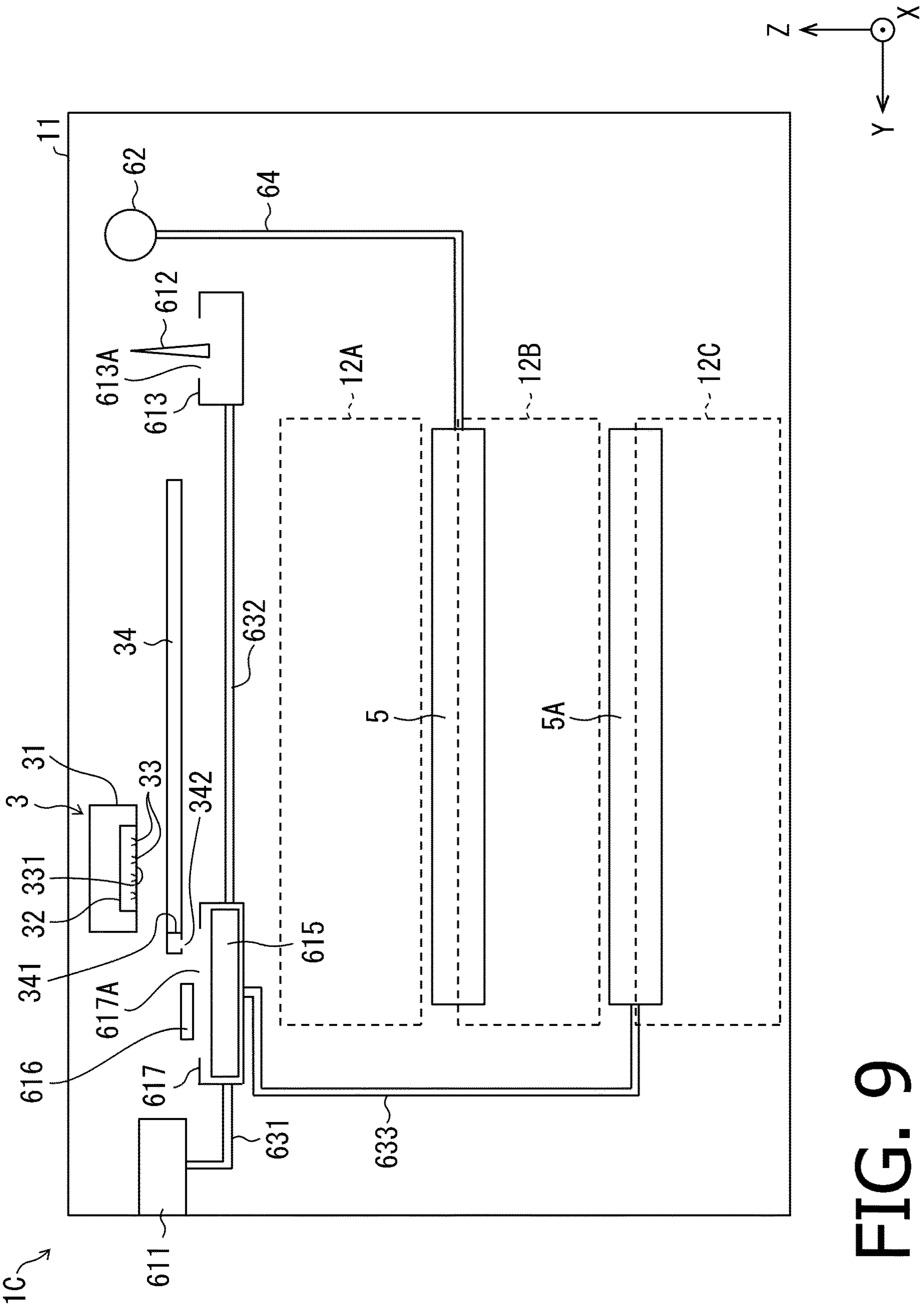
FIG. 9 is an illustrative view inside the inkjet printer viewed from a frontside.

The fourth embodiment of the present disclosure will be described below. In the following paragraphs, items that are substantially identical to those described above will be referred to by the same reference signs, and description of those items is herein omitted. FIG. 9 is a cross-sectional view to illustrate an inner structure of the inkjet printer 1C according to the fourth embodiment.

As shown in FIG. 9, the inkjet printer 1C differs from the inkjet printer 1 in that the inkjet printer 1C is provided with the intermediate box 617 in place of the ink collecting container 614. Moreover, the inkjet printer 1C differs from the inkjet printer 1B in that the second waste liquid box 5A is connected not to the first waste liquid box 5 but to the intermediate box 617. The first waste liquid box 5 is connected with the maintenance unit 6.

The intermediate box 617 is connected to the duct 611 through a waste liquid tube 631 and to the second waste liquid box 5A through a waste liquid tube 633. The ink being waste liquid collected by the duct 611 may be discharged into the intermediate box 617 through the waste liquid tube 631, and the ink stored in the liquid reservoir 613 may be discharged into the intermediate box 617 through a waste liquid tube 632.

The intermediate box 617 has the waste liquid absorber 615 inside. The waste liquid absorber 615 may absorb the waste liquid received in the intermediate box 617. The ink discharged in the flushing process may be guided by the flushing unit 616 through an opening 617A in the intermediate box 617 to the waste liquid absorber 615.

Moreover, the intermediate box 617 may receive the ink being waste liquid discharged from the waste liquid chute 341 in the platen 34. The waste liquid received in the intermediate box 617 may be discharged from the intermediate box 617 and stored in the second waste liquid box 5A through the waste liquid tube 633. Thus, the duct 611, the wiper 612, the liquid reservoir 613, the platen 34, the flushing unit 616, and the intermediate box 617 may collect the ink being waste liquid discharged from the nozzles 33 in the recording head 32.

The second waste liquid box 5A is connected with the intermediate box 617 and store the waste liquid collected by the intermediate box 617. The first waste liquid box 5 is connected with the maintenance unit 6, and the second waste liquid box 5A is connected with the intermediate box 617. Therefore, with the first waste liquid box 5 and the second waste liquid box 5A, the waste liquid may be collected from the maintenance unit 6 and from the intermediate box 617 in different routes.

Seventh Modified Example

Optionally, in the inkjet printer 1C shown in FIG. 9, the first waste liquid box 5 may be connected through the waste liquid tube 64 to the duct 611, the liquid reservoir 613, the platen 34, or the intermediate box 617 rather than the pump 62. For another example, optionally, the first waste liquid box 5 may be connected through the waste liquid tube 64 to the ink collecting container 614 (see FIG. 4).

In the arrangement where the first waste liquid box 5 is connected to the liquid reservoir 613, the waste liquid collected by the wiper 612 may be stored in the first waste liquid box 5. In the arrangement where the first waste liquid box 5 is connected to the ink collecting container 614, the inkjet printer 1C may have the ink collecting container 614 in place of the intermediate box 617, and the waste liquid collected by the flushing unit 616 may be stored in the first waste liquid box 5.

Optionally, the second waste liquid box 5A may be connected through the waste liquid tube 633 to the pump 62, the duct 611, the liquid reservoir 613, or the platen 34 rather than the intermediate box 617. For another example, optionally, the second waste liquid box 5A may be connected to the ink collecting container 614 (see FIG. 4).

In the arrangement where the second waste liquid box 5A is connected to the liquid reservoir 613, the waste liquid collected by the wiper 612 may be stored in the second waste liquid box 5A. In the arrangement where the second waste liquid box 5A is connected to the ink collecting container 614, the inkjet printer 1C may have the ink collecting container 614 in place of the intermediate box 617, and the waste liquid collected by the flushing unit 616 may be stored in the second waste liquid box 5A.

According to the seventh modified example, the first waste liquid box 5 and the second waste liquid box 5A are connected to the separate devices that may collect the waste liquid, and the first waste liquid box 5 and the second waste liquid box 5A may store the waste liquid separately collected waste liquid.

Fifth Embodiment

Figure 10:
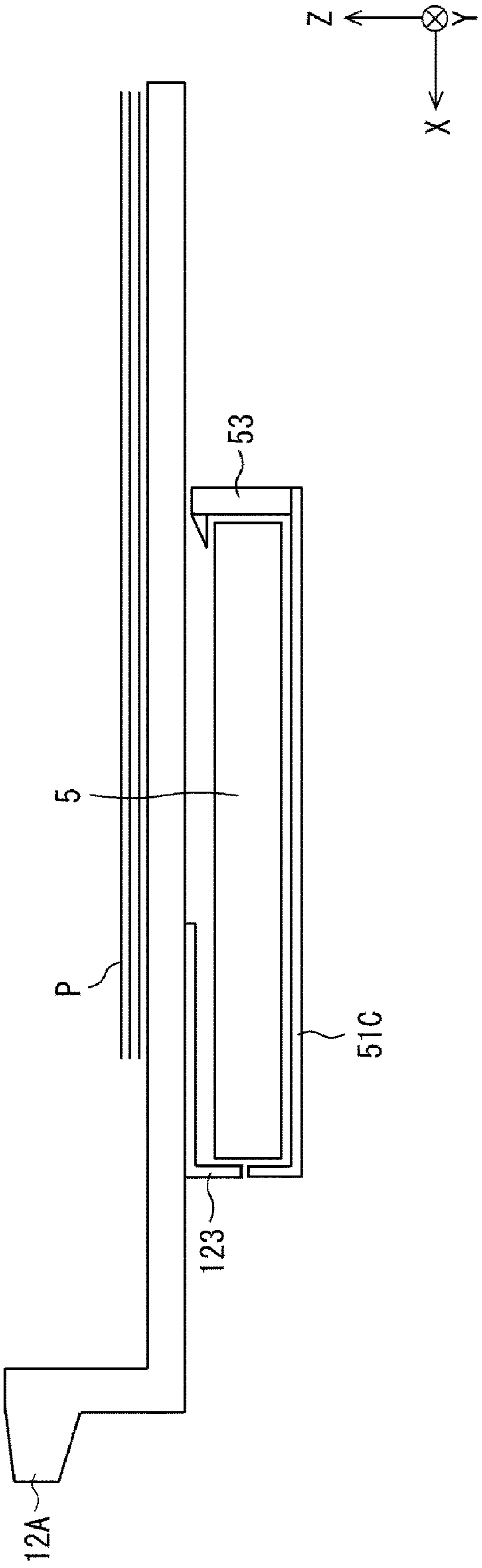
FIG. 10 is a cross-sectional view to illustrate arrangement of a first tray and a holder to support a first waste liquid box in an inkjet printer.

A fifth embodiment of the present disclosure will be described below. In the following paragraphs, items that are substantially identical to those described above will be referred to by the same reference signs, and description of those items is herein omitted. FIG. 10 is a cross-sectional view to illustrate arrangement of the first tray 12A and a holder 51C to support the first waste liquid box 5 in an inkjet printer according to the fifth embodiment.

The holder 51A (see FIGS. 2 and 6) may be replaced with the holder 51C as shown in FIG. 10. Moreover, a cover 123 may be provided to a lower surface of the first tray 12A. The holder 51C has an engageable portion 53. The cover 123 may be inserted in the housing 11 to cover the first waste liquid box 5. With the cover 123 covering the first waste liquid box 5, the position of the first waste liquid box 5 may be fixed steadily between the cover 123 and the holder 51C.

Optionally, on a side wall of the holder 51C, an urging member to urge the first waste liquid box 5 may be provided. The urging member may be, for example, a spring with elasticity. The urging member may urge the first waste liquid box 5 in a direction parallel to a plane spreading in the X-axis direction and the Y-axis direction. Thereby, the position of the first waste liquid box 5 may be fixed between the first tray 12A and the holder 51C steadily.

Moreover, the cover 123 may be provided to a lower surface of the second tray 12B in the inkjet printer 1A (see FIG. 6). In this arrangement, the cover 123 may be inserted in the housing 11 to cover the second waste liquid box 5A. Furthermore, the holder 51B may optionally be replaced with the holder 51C.

Eighth Modified Example

The liquid discharging apparatus according to the present disclosure may not necessarily be limited to the inkjet printers 1, 1A, 1B, 1C as described in the first through fifth embodiments but may be embodied as, for example, a multifunction peripheral machine having a plurality of functions including a printing function, a scanning function, and a copier function. For another example, a number of the trays in the liquid discharging apparatus may not necessarily be limited to two or three but may be four or more, and the liquid discharging apparatus may have a plurality of waste liquid boxes, which may be located between the four or more trays.

For another example, the inkjet printers 1, 1A-1C may not necessarily be limited to the serial-styled inkjet printer, in which the ink may be discharged from the nozzles 33 while the carriage 31 moves in the scanning direction. For example, the inkjet printers 1, 1A-1C may be line-styled inkjet printers, in which a recording head 32 extending longitudinally in the scanning direction throughout the width of the sheet P is fixed to a position within the housing 11.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A liquid discharging apparatus, comprising:
a housing;
a first tray configured to store a printable medium;
a second tray configured to store a printable medium, the second tray being located at a position lower than the first tray;
a liquid discharging head having nozzles configured to discharge liquid; and
a first waste liquid storage demountably mounted in the housing, the first waste liquid storage being configured to store waste liquid being the liquid discharged from the nozzles of the liquid discharging head,
wherein the first waste liquid storage is located between the first tray and the second tray.

2. The liquid discharging apparatus according to claim 1, further comprising a holder configured to support the first waste liquid storage,
wherein an opening, through which the first waste liquid storage is mounted in and demounted from the housing, is formed in the holder.

3. The liquid discharging apparatus according to claim 2, wherein
the first tray is demountably mounted in the housing, and
the opening is formed on an upper side of the holder and is located below the first tray.

4. The liquid discharging apparatus according to claim 2, wherein
the first tray is demountably mounted in the housing and has a protrusion extending downward from a bottom surface of the first tray, and
the opening formed in the holder at least partly overlaps the protrusion of the first tray in a direction, in which the first waste liquid storage is mountable in and demountable from the housing.

5. The liquid discharging apparatus according to claim 2, wherein
the second tray is demountably mounted in the housing and has a supporting surface for supporting the printable medium and a side wall extending upward from the supporting surface, and
the opening formed in the holder at least partly overlaps the side wall of the second tray in a direction, in which the first waste liquid storage is mountable in and demountable from the housing.

6. The liquid discharging apparatus according to claim 2, wherein
the first tray and the second tray are demountably mounted in the housing,
the first waste liquid storage is located separately from the first tray and from the second tray, the holder is fixed to the housing, and when at least one of the first tray and the second tray is being mounted in or demounted from the housing, the first waste liquid storage is fixed steadily at a position.

7. The liquid discharging apparatus according to claim 1, further comprising a feeder unit configured to feed the printable medium from the second tray to the liquid discharging head,
wherein the first waste liquid storage is located in a remainder of a space created for locating the feeder unit between the first tray and the second tray.

8. The liquid discharging apparatus according to claim 1, further comprising a feeder unit configured to feed the printable medium from the second tray to the liquid discharging head, wherein the first tray is demountably mounted in the housing, and wherein the first waste liquid storage is located at a frontward position with respect to the feeder unit in a frontward direction, the frontward direction being a same direction as a direction, in which the first tray is demountable from the housing.

9. The liquid discharging apparatus according to claim 1, further comprising:

a third tray configured to store a printable medium, the third tray being located at a position lower than the second tray, and a second waste liquid storage demountably mounted in the housing, the second waste liquid storage being configured to store the waste liquid being the liquid discharged from the nozzles of the liquid discharging head, wherein the second waste liquid storage is located between the second tray and the third tray.

10. The liquid discharging apparatus according to claim 9, further comprising:

a waste liquid collecting device configured to collect the waste liquid being the liquid discharged from the nozzles of the liquid discharging head; and a switcher, wherein the first waste liquid storage and the second waste liquid storage are configured to store the waste liquid collected by the waste liquid collecting device, and wherein the switcher is configured to switch flow paths for the waste liquid between a first flow path, the first flow path being a path for the waste liquid to flow from the waste liquid collecting device to the first waste liquid storage, and a second flow path, the second flow path being a path for the waste liquid to flow from the waste liquid collecting device to the second waste liquid storage.

11. The liquid discharging apparatus according to claim 9, further comprising a waste liquid collecting device configured to collect the waste liquid being the liquid discharged from the nozzles of the liquid discharging head, wherein the first waste liquid storage is configured to store the waste liquid collected by the waste liquid collecting device, and the second waste liquid storage is connected with the first waste liquid storage and is configured to store the waste liquid ejected from the first waste liquid storage.

12. The liquid discharging apparatus according to claim 9, further comprising a first waste liquid collecting device and a second waste liquid collecting device, the first waste liquid collecting device and the second waste liquid collecting device being configured to collect the waste liquid being the liquid discharged from the nozzles of the liquid discharging head, wherein the first waste liquid storage is configured to store the waste liquid collected by the first waste liquid collecting device, and the second waste liquid storage is configured to store the waste liquid collected by the second waste liquid collecting device.

13. The liquid discharging apparatus according to claim 1, further comprising a waste liquid collecting device configured to collect the waste liquid being the liquid discharged from the nozzles of the liquid discharging head, wherein the first waste liquid storage is configured to store the waste liquid collected by the waste liquid collecting device.

14. The liquid discharging apparatus according to claim 13, wherein the waste liquid collecting device is a maintenance unit configured to perform a maintenance work on the liquid discharging head.

15. The liquid discharging apparatus according to claim 13, wherein the waste liquid collecting device is a duct configured to suction mist of the liquid produced inside the housing.

16. The liquid discharging apparatus according to claim 13, wherein the waste liquid collecting device is a wiper configured to remove the liquid from the nozzles.

17. The liquid discharging apparatus according to claim 1, wherein an opening, through which the first tray is mounted in and demounted from the housing, is formed in the housing, and a width of the first waste liquid storage is smaller than or equal to a width of the opening in a widthwise direction, the widthwise direction being parallel to a nozzle surface of the liquid discharging head and intersecting orthogonally with a mounting/demounting direction, in which the first tray is mountable in and demountable from the housing.

* * * * *